(12) United States Patent
Laitkorpi et al.

(10) Patent No.: US 10,037,370 B2
(45) Date of Patent: Jul. 31, 2018

(54) METHOD, A SERVER, A SYSTEM AND A COMPUTER PROGRAM PRODUCT FOR COPYING DATA FROM A SOURCE SERVER TO A TARGET SERVER

(71) Applicant: M-Files Oy, Tampere (FI)

(72) Inventors: Markku Laitkorpi, Tampere (FI); Antti Nivala, Pirkkala (FI); Juho Nokela, Tampere (FI); Timo Partanen, Lempaala (FI); Juha Lepola, Tampere (FI)

(73) Assignee: M-FILES OY, Tampere (FI)

( * ) Notice: Subject to any disclaimer, the term of this patent is extended or adjusted under 35 U.S.C. 154(b) by 340 days.

(21) Appl. No.: 13/900,123

(22) Filed: May 22, 2013

(65) Prior Publication Data

US 2014/0006351 A1     Jan. 2, 2014

Related U.S. Application Data

(63) Continuation-in-part of application No. 13/537,720, filed on Jun. 29, 2012, now Pat. No. 9,417,796.

(51) Int. Cl.
    *G06F 17/30*     (2006.01)
    *H04L 29/08*     (2006.01)
    *G06Q 30/04*     (2012.01)

(52) U.S. Cl.
    CPC .. *G06F 17/30581* (2013.01); *G06F 17/30011* (2013.01); *G06F 17/30079* (2013.01);
    (Continued)

(58) Field of Classification Search
    CPC ......... G06F 17/30286; G06F 17/30067; G06F 3/067
    (Continued)

(56) References Cited

U.S. PATENT DOCUMENTS 8,655,848 B1 *    2/2014    Leverett ............ G06F 17/30088
                                                                            707/660
2003/0110176 A1    6/2003    Morgan et al.
(Continued)

OTHER PUBLICATIONS

E. Rahm, et al.; "A survey of approaches to automatic schema matching;" VLDB Journal, Springer Verlag, Berlin, Germany; vol. 10; Nov. 21, 2001; pp. 334-350.

*Primary Examiner* — Syling Yen
*Assistant Examiner* — Bao Tran
(74) *Attorney, Agent, or Firm* — Ware, Fressola, Maguire & Barber LLP

(57) ABSTRACT

The invention relates to a method for replicating metadata structure of a target server according to metadata structure of a source server. The method comprises importing the metadata structure of the source server to the target server, wherein the metadata structure defines by means of structure elements semantics for a metadata, which metadata is associated with electronic objects being stored in said source server; mapping the structure elements to corresponding structure elements in the target server according to mapping rules, wherein similarity mapping is performed for referenced structure elements and identity mapping is performed for fully represented structure elements; and copying content elements—if available—containing at least electronic objects with associated metadata from the source server to the target server by applying the imported metadata structure.

19 Claims, 14 Drawing Sheets

(52) U.S. Cl.
CPC ....... *G06F 17/30212* (2013.01); *G06Q 30/04* (2013.01); *H04L 67/1095* (2013.01)

(58) Field of Classification Search
USPC ........................................................ 707/609
See application file for complete search history.

(56) References Cited

U.S. PATENT DOCUMENTS

| | | |
|---|---|---|
| 2007/0078885 A1 | 4/2007 | Klein, Jr. |
| 2007/0233828 A1* | 10/2007 | Gilbert .................. 709/223 |
| 2008/0034015 A1 | 2/2008 | Behnen et al. |
| 2008/0162530 A1 | 7/2008 | van Eikeren et al. |
| 2009/0006409 A1* | 1/2009 | Yang .................. G06F 8/20 |
| 2009/0222498 A1* | 9/2009 | Lu et al. ................ 707/204 |
| 2011/0320406 A1* | 12/2011 | Howell ............ G06F 11/2069 707/634 |
| 2012/0030247 A1 | 2/2012 | Yambal et al. |
| 2013/0054524 A1* | 2/2013 | Anglin ............ G06F 17/30575 707/624 |
| 2013/0226870 A1* | 8/2013 | Dash ................ G06F 3/0619 707/634 |
| 2013/0232111 A1* | 9/2013 | Akirav ............ G06F 11/1456 707/634 |
| 2013/0275373 A1* | 10/2013 | Uola ................ H04L 67/1095 707/634 |
| 2013/0325803 A1* | 12/2013 | Akirav ............ G06F 17/30575 707/634 |

* cited by examiner

| | |
|---|---|
| Name: *letter.doc* | FILENAME |
| Creator: *John Welsh* | GENERATOR |
| Created: *2012-05-01* | GENERATED |
| Category: *projects* | GROUP |
| Type: *offer* | TYPE |
| Sent: *2012-05-08* | MAILED |
| Client: *TheFirm LTD* | CLIENT |
| Client number: *1209324* | CLIENT NUMBER |
| Last modified: *Ella May* | LAST UPDATED |

200 / 201

| | |
|---|---|
| Title: | FILENAME |
| Author: | GENERATOR |
| Created: | GENERATED |
| Class: | GROUP |
| Sent: | MAILED |
| Client: | CLIENT |
| Client number: | CLIENT NUMBER |
| Last modified: | LAST UPDATED |

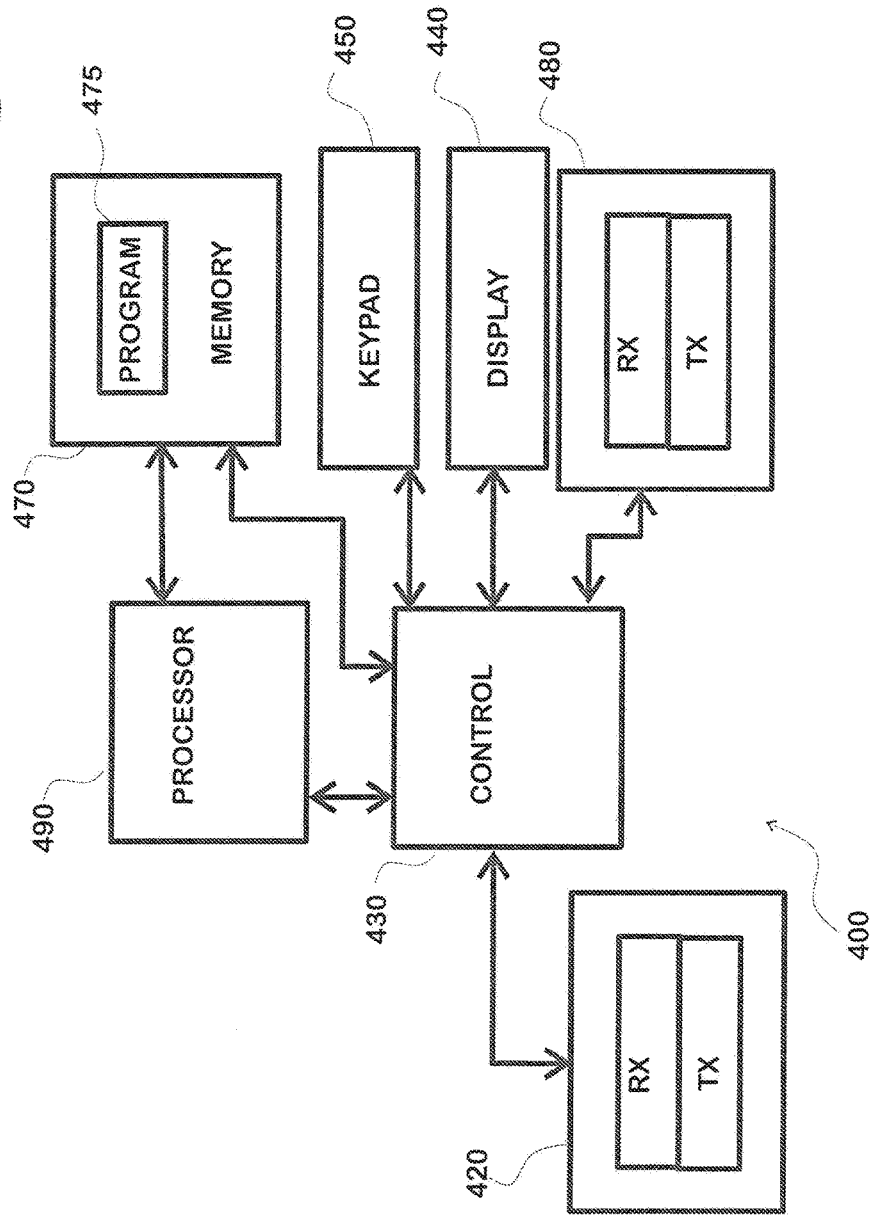

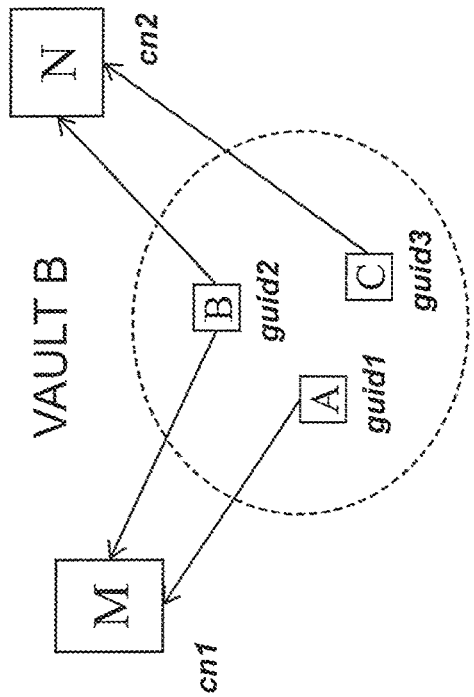
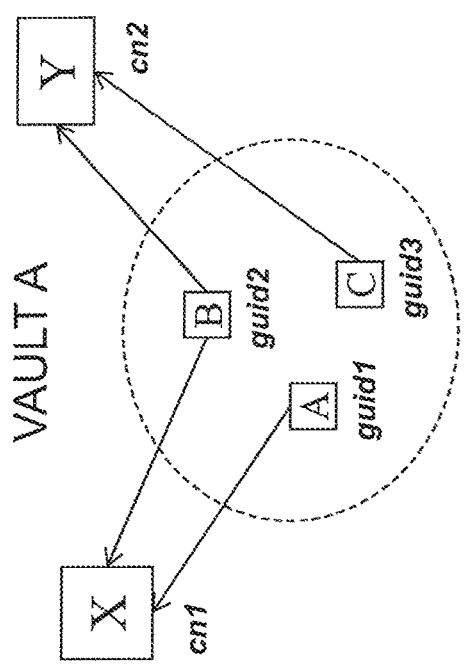
Fig. 8b
Fig. 8a

METHOD, A SERVER, A SYSTEM AND A COMPUTER PROGRAM PRODUCT FOR COPYING DATA FROM A SOURCE SERVER TO A TARGET SERVER

CROSS-REFERENCE TO RELATED APPLICATION

This application is a continuation-in-part of co-pending U.S. patent application Ser. No. 13/537,720 filed on Jun. 29, 2012, which application is hereby incorporated by reference in its entirety. This continuation-in-part application is claiming domestic priority under all applicable sections of 35 U.S.C. § 120.

FIELD OF THE INVENTION

The present invention relates to data transfer between servers. In particular, the present invention relates to an adaptation of metadata structure between the servers. Yet further, the invention relates to a content management system.

BACKGROUND OF THE INVENTION

Enterprise Content Management (ECM) system refers to a system organizing and storing organization's electronic documents and other business-related objects and/or content. ECM system may comprise content management systems (CMS), document management systems (DMS) and data management systems. Such systems comprise various features for managing electronic documents, e.g. storing, versioning, indexing, searching for and retrieval of documents. It is appreciated that there are both dynamic and static content management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

The content management system may be distributed in such a manner that it comprises several servers or storages for different purposes.

SUMMARY OF THE INVENTION

Now there has been invented an improved method and technical equipment implementing the method, to alleviate problems that might occur when data is transmitted between different servers, and when documents are accessed and processed via one of the servers.

Various aspects of the invention include a method, a server, a system, a computer program product and a content management system, which are characterized by what is stated in the independent claims. Various embodiments of the invention are disclosed in the dependent claims.

According to a first aspect, a method for replicating metadata structure of a source server to a target server, comprises importing the metadata structure of the source server to the target server, wherein the metadata structure defines by means of structure elements semantics for a metadata, which metadata is associated with electronic objects being stored in said source server; mapping the structure elements to corresponding structure elements in the target server according to mapping rules wherein similarity mapping is performed for referenced structure elements and identity mapping is performed for fully represented structure elements; copying content elements—if available—containing at least electronic objects with associated metadata from the source server to the target server by applying the imported metadata structure.

According to a second aspect, a source server comprises a processor, a memory including computer program code, the memory and the computer program code configured to transmit a metadata structure to a target server, wherein the metadata structure defines by means of structure elements semantics for a metadata, which metadata is associated with electronic objects being stored in said source server; wherein the structure elements are mappable to corresponding structure elements in the target server according to mapping rules, wherein similarity mapping is performed for referenced structure elements and identity mapping is performed for fully represented structure elements; and to copy content elements—if available—containing at least electronic objects with associated metadata to the target server by applying the transmitted metadata structure.

According to a third aspect, a target server comprises a processor, a memory including computer program code, the memory and the computer program code configured to receive a metadata structure from a source server, wherein the metadata structure defines by means of structure elements semantics for a metadata, which metadata is associated with electronic objects being stored in said source server; map the structure elements to corresponding structure elements in the target server according to mapping rules, wherein similarity mapping is performed for referenced structure elements and identity mapping is performed for fully represented structure elements; copy content elements—if available—containing at least electronic objects with associated metadata from the source server by applying the received metadata structure.

According to a fourth aspect, a server system comprises a processor, memory including computer program code, the memory and the computer program code configured to, with the processor, cause the server to harmonize metadata structure of a target server according to metadata structure of a source server by importing the metadata structure of the source server to the target server, wherein the metadata structure defines by means of structure elements semantics for a metadata, which metadata is associated with electronic objects being stored in said source server; mapping the structure elements to corresponding structure elements in the target server according to mapping rules, wherein similarity mapping is performed for referenced structure elements and identity mapping is performed for fully represented structure elements; copying content elements—if available—containing at least electronic objects with associated metadata from the source server to the target server by applying the imported metadata structure.

According to a fifth aspect, a computer program product comprises a computer-readable medium bearing computer program code embodied therein for use with a computer, the computer program code comprising: code for importing the metadata structure of the source server to the target server, wherein the metadata structure defines by means of structure elements semantics for a metadata, which metadata is associated with electronic objects being stored in said source server; code for mapping the structure elements to corresponding structure elements in the target server according to mapping rules, wherein similarity mapping is performed for referenced structure elements and identity mapping is performed for fully represented structure elements; code for copying content elements—if available—containing at least electronic objects with associated metadata from the source server to the target server by applying the imported metadata structure.

According to an embodiment, the semantics define at least application logic for using structure elements.

According to an embodiment, similarity mapping is based on common names of structure elements.

According to an embodiment, identity mapping is based on globally unique identifications of structure elements.

According to an embodiment, referenced structure elements are depended on by fully represented structure elements.

According to an embodiment, the content elements and the structure elements are packaged and transmitted in said packet.

DESCRIPTION OF THE DRAWINGS

In the following, various embodiments of the invention will be described in more detail with reference to the appended drawings, in which

FIG. 3 shows the metadata structure of FIG. 2 with common names;

FIG. 4 shows an embodiment of a server in a simplified manner;

FIGS. 8a-8b illustrate dependencies of metadata structure fragments in different vaults according to an embodiment;

DETAILED DESCRIPTION OF THE EMBODIMENTS

In the following, several embodiments of the invention will be described in the context of content management system having a plurality of servers. It is to be noted, however, that the invention is not limited to a content management system. In fact, the different embodiments may have applications widely in any multiserver environment.

Figure 1:
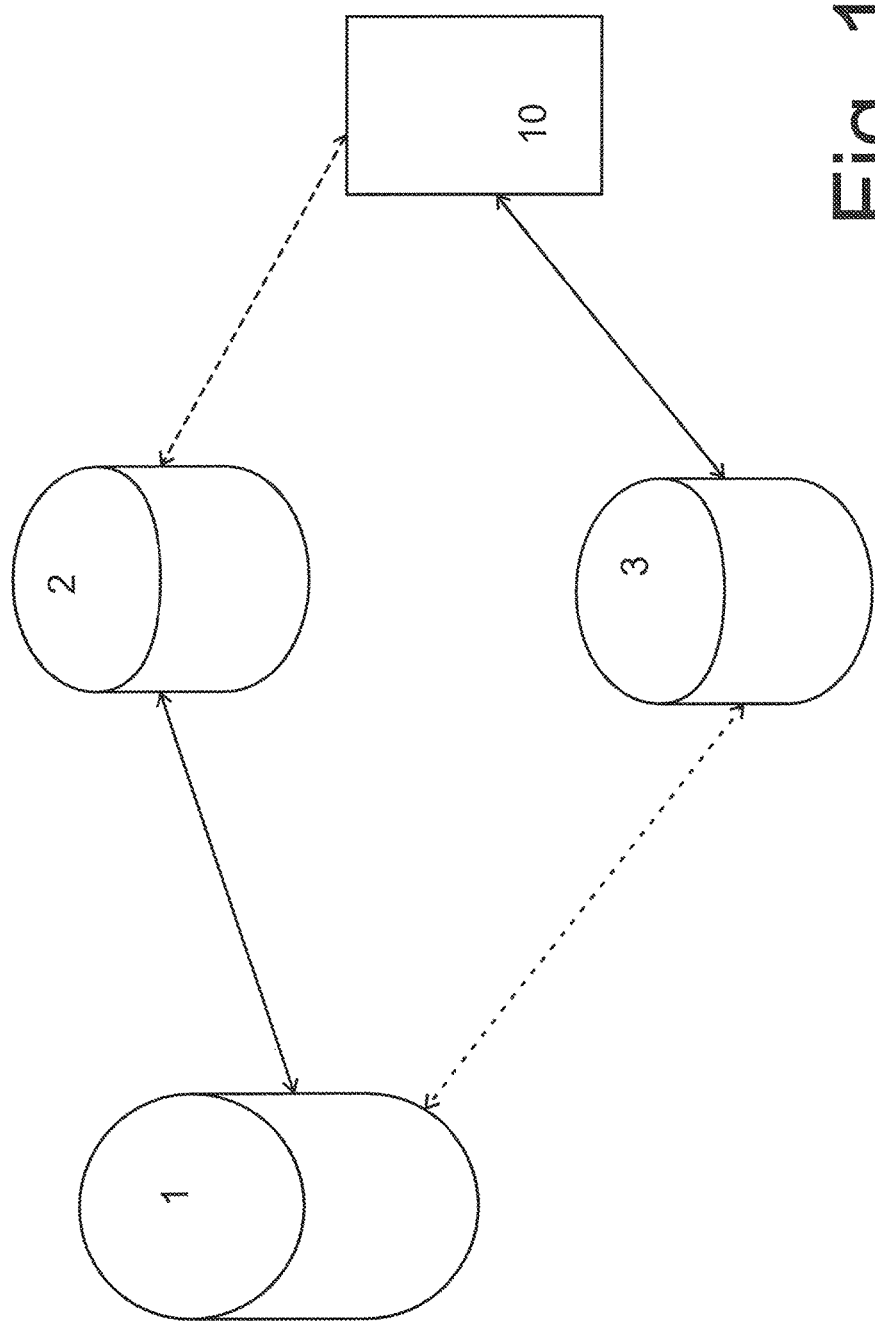
FIG. 1 shows an example of a system in a simplified manner.

The present embodiments relate to a system, such as a content management system, an example of which is shown in FIG. 1. Such a system may comprise a main server 1, at least one caching replica server 2 and at least one local main server 3. Another term to be used instead of "server" is vault. These terms are used in parallel. According to an embodiment, the servers are so called on-premise servers. According to another embodiment, the main server 1 is a cloud-based server, whereby the caching replica server 2 and the local main server 3 are on-premise servers. According to yet one other embodiment, at least one of the servers is a cloud-based server, while the others are on-premise servers. Such a content management system having both cloud-based server(s) and on-premise server(s) is here called a hybrid content management system.

"On-premise" means that the document management server(s) are located behind the organization's network firewall, where they are generally not accessible by the public. Instead, such "on-premise" server(s) are generally accessible only by users within the firewall-protected local area network, or by connecting to the organization's virtual private network with appropriate tools, requiring organization-specific authentication. The "on-premise" server(s) are typically physically located in buildings owned or leased by the organization, or in a private data center controlled and maintained by a contractor of the organization. As opposed to an "on-premise" document management system, a "cloud-based" document management system has its server(s) located outside the organization's firewall.

The caching replica server 2 and the local main server 3 may reside in a remote unit of the content management system. There can be more than one remote units in the content management system, and each remote unit have at least one caching replica server and/or at least one local main server. The number of servers may vary according to the situation. For example, for one remote unit, there can be as many local main server as there are caching replica server, or there can be different amount of local main servers and caching replica servers.

The main server 1 can comprise various features for managing electronic documents, e.g. storing, versioning, indexing, searching for and retrieval of documents. The main server 1 can be a dynamic system, where stored files comprise identifications that define their existence in the storage. "File" in this disclosure relates to a medium that has been created by a certain application. For example, a piece of text created by using the Microsoft Word application and saved on the "C:\" drive is a file. Similarly, a drawing created by using the AutoCAD application represents a file. The file can be associated with metadata, whereby the file becomes a "document". Instead of term "document" also term "electronic object" can be used. "Metadata" refers to information on a document's properties. For example, a creator of the file or a creation date may represent content of the metadata. In addition to the metadata, the document may also comprise version history and reference information to other documents.

The main server 1 may store documents together with the metadata, version history as well as reference information. In an embodiment, the caching replica server 2 is a replica of the main server 1, being configured to store the documents' file data only, and not documents' metadata, version history and reference information. The caching replica server 2 can be used by a client 10 to access the files instead of the main server 1. The caching replica server 2 may have a live connection to the main server 1, whereby if e.g. metadata is needed, that can be obtained from the main server 1. Such a use of a caching replica server 2 saves the bandwidth, because not all the data in the main server 1 needs to be copied to the caching replica server 2.

A local main server 3 may be parallel to caching replica server 2. They can be located in a same physical device or can be separated. However, the local main server 3 is a copy of the main server 1 with respect to such data that is relevant to the user. In a situation, where the main server 1 is a cloud service, the main server 1 can be a warm copy (takes the synchronization delay into account) of the local main server 3. The main server 1 can be used, if local main server 3 is temporarily down. The local main server 3 can also be a relevant subset of main server 1, whereby the local main server 3 provides locally optimized user experience while the overall cloud environment ensures the high availability of the full data via caching replica server.

The servers also comprise a metadata structure that creates stronger semantics and business logic to the metadata. The metadata structure may define property definitions for the metadata, classes (templates) available for the metadata, business process rules, user interface views etc. The metadata structure may also have an application level defining how to use/modify the name-value pairs in the metadata.

In order to build up a system, such as the one shown in FIG. 1, the content of the main server 1 needs to be copied to the local main server 3. However, before any content can be copied, at first the metadata structure of the main server 1 needs to be imported to the local main server 3 to have a basis for the content.

Figure 2:
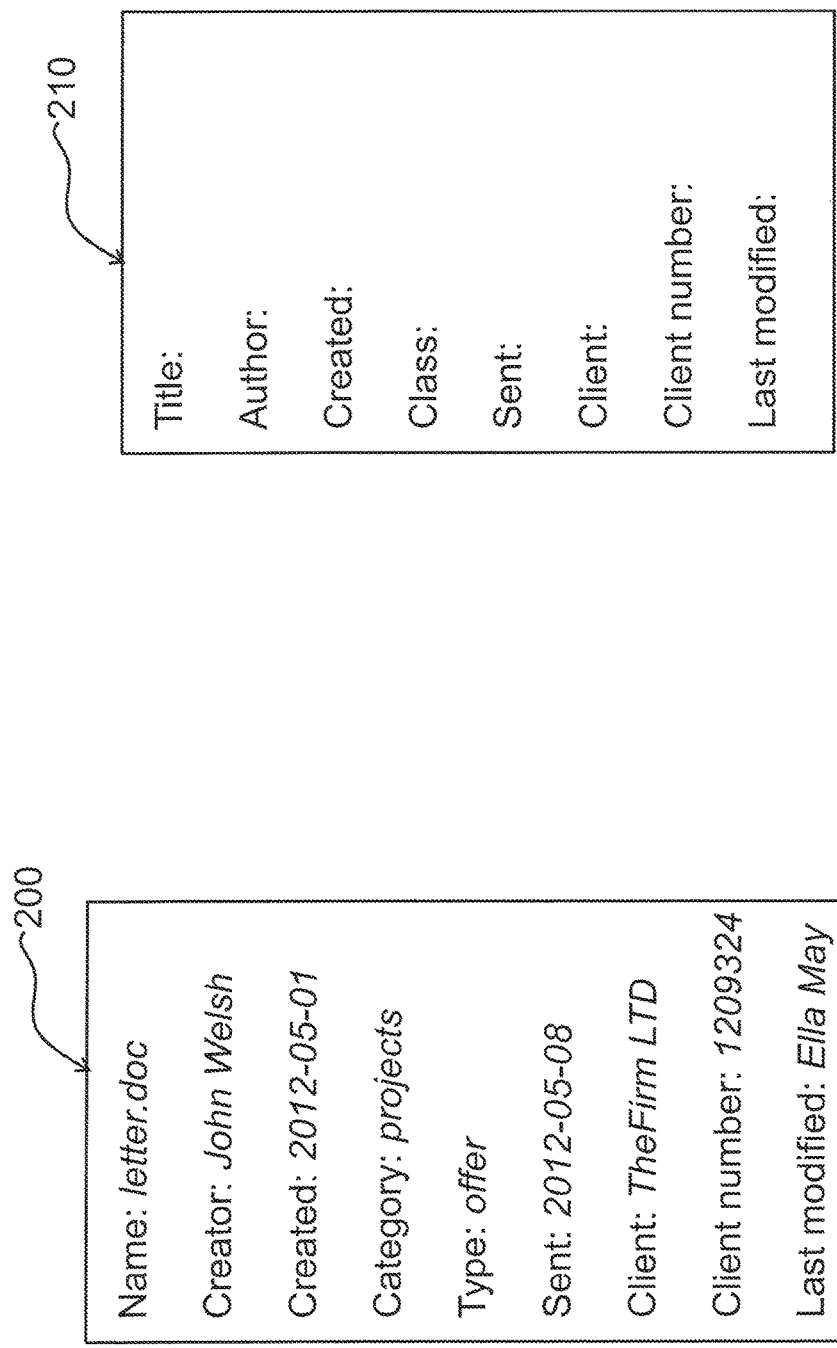
FIG. 2 shows two examples of metadata structures.
Figure 6:
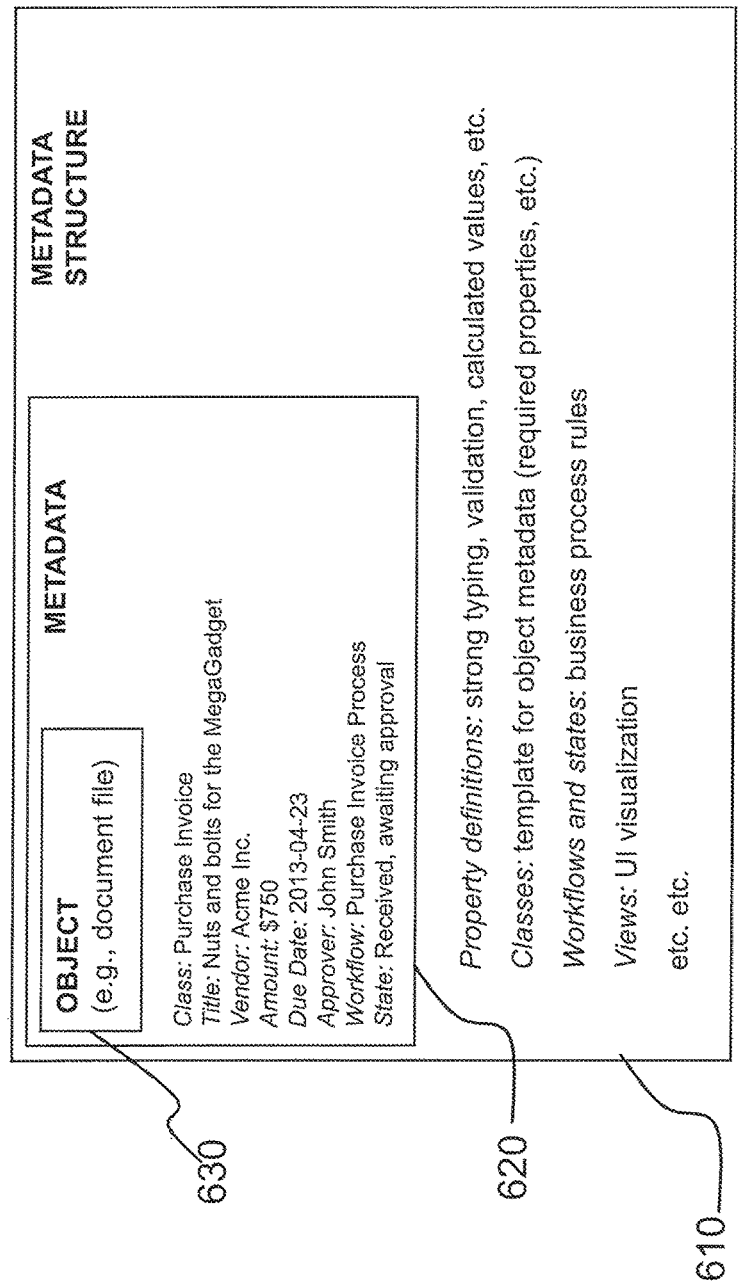
FIG. 6 shows an example of a metadata structure according to an embodiment.

An example of a metadata structure 600 is shown in FIG. 6. The actual content is an electronic object 630, which is e.g. a document file—as described above. The object is associated with metadata 620, of which further examples are shown in FIG. 2 with corresponding text paragraphs in below. The metadata 620 comprises one or more name-value pairs which define the object in question. Further, the metadata is defined by a metadata structure 610 that creates semantics and business logic to the metadata 620. For example, as shown in FIG. 6, the metadata structure 610 defines the property definitions for the metadata, classes (templates) available for the metadata, business process rules, user interface views etc. The metadata structure also has an application level defining how to use/modify the name-value pairs in the metadata. This will be discussed in detail below. This application logic also needs to be imported between multiple vaults across organization.

When data between vaults (servers) is copied, the metadata structure in the target vault needs to be similar than in the source vault. However, if there are numerous amount of vaults in an organization, the manual work for maintaining the metadata structure is laborious and prone to errors. The present embodiments propose a technique by means of which the work for importing both the metadata structure between different vaults is automated.

When metadata structure is copied between multiple vaults, this may be done in a disciplined way by utilizing a development vault, a test vault and one or more production vaults throughout the organization. In the development vault, the changes and modifications are made to the metadata structure. A complete metadata structure or a part of it is replicated to the test vault having realistic content. By this any functional anomalies may be detected and removed. Once successfully tested, the metadata structure can then be further replicated to the production vault(s).

For copying (i.e. replicating) data between vaults, two additional ways can be distinguished: synchronization and harmonization. In synchronization, the metadata structure in one of several vaults is manually slightly modified or changed. The changes in the metadata structure are replicated directly to the other vaults. In harmonization, the vaults are initially similar in a logical sense, but not completely identical. This means that corresponding elements have a distinct globally unique identifiers (GUID). In harmonization, a common name mapping can be used to find out corresponding elements, and then their GUID's may be harmonized. After this, the elements can be processed as the same.

Figure 7:
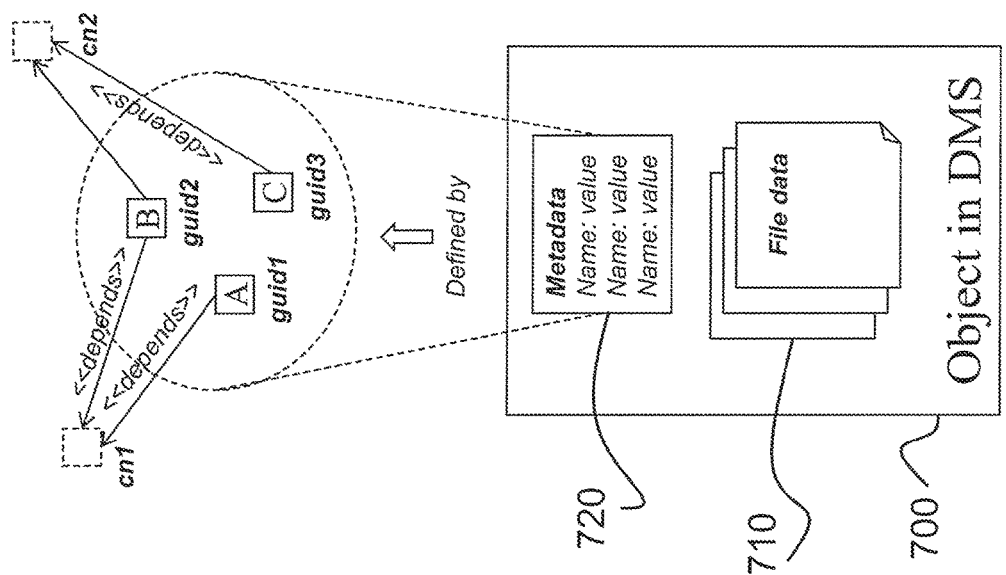
FIG. 7 shows an example of an electronic object containing file data and being associated with metadata according to an embodiment.

FIG. 7 illustrates an example of an object 700 containing file data 710 and being associated with metadata 720 having name-value-pairs. The metadata is further defined by an application logic having metadata structure fragments A, B, C, i.e. fully represented structure elements, representing an application. The metadata structure fragments A, B, C are each identified by globally unique identifier (GUID), guid1, guid2, guid3 respectively. The metadata structure fragments A, B, C have dependencies on other structure elements, i.e. referenced structure elements, being defined with common names (cn1, cn2). Said other structure elements do not belong to application directly but are related to the metadata structure fragments A, B and B, C respectively.

FIG. 8*a* illustrates the dependencies of metadata structure fragments A, B, C, when imported to a vault A. It is realized that dependencies of the fragments A, B are bound to the element X, and dependencies of the fragments B, C are bound to the element Y. However, when imported to a vault B, as illustrated in FIG. 8*b*, dependencies of the fragments A, B are bound to element M, and dependencies of the fragments B, C are bound to element N. Therefore, depending on the vault the fragments are replicated to, the dependency bindings may vary.

What is to be noticed from FIGS. 7 and 8*a*-8*b*, is that such metadata structure fragments that belong to the metadata structure, i.e. fully represented structure elements, such as fragments A, B, C, are usually mapped in the target vault with their GUID, thus relying on the globally unique identifier of the elements. However, the elements from which the metadata structure fragments depend from, i.e. referenced structure elements, are mapped in the target vault with their common names, cn1, cn2 thus allowing an adjustable identity mapping between the elements. The mapping is thus based on mapping rules, wherein similarity mapping (based on common names) is performed for referenced structure elements and identity mapping (based on identifiers, such as GUID) is performed for fully represented structure elements. Common names are further discussed in relation to FIG. 3 and corresponding paragraphs. The GUID differs from common name in that a certain GUID defines the "same" object or element throughout the vaults. This means that an object or an element with certain GUID in vault A is the "same" object or an element in vault B. Same put in quotes here means conceptually the same, but not necessarily physically the same.

Figure 9:
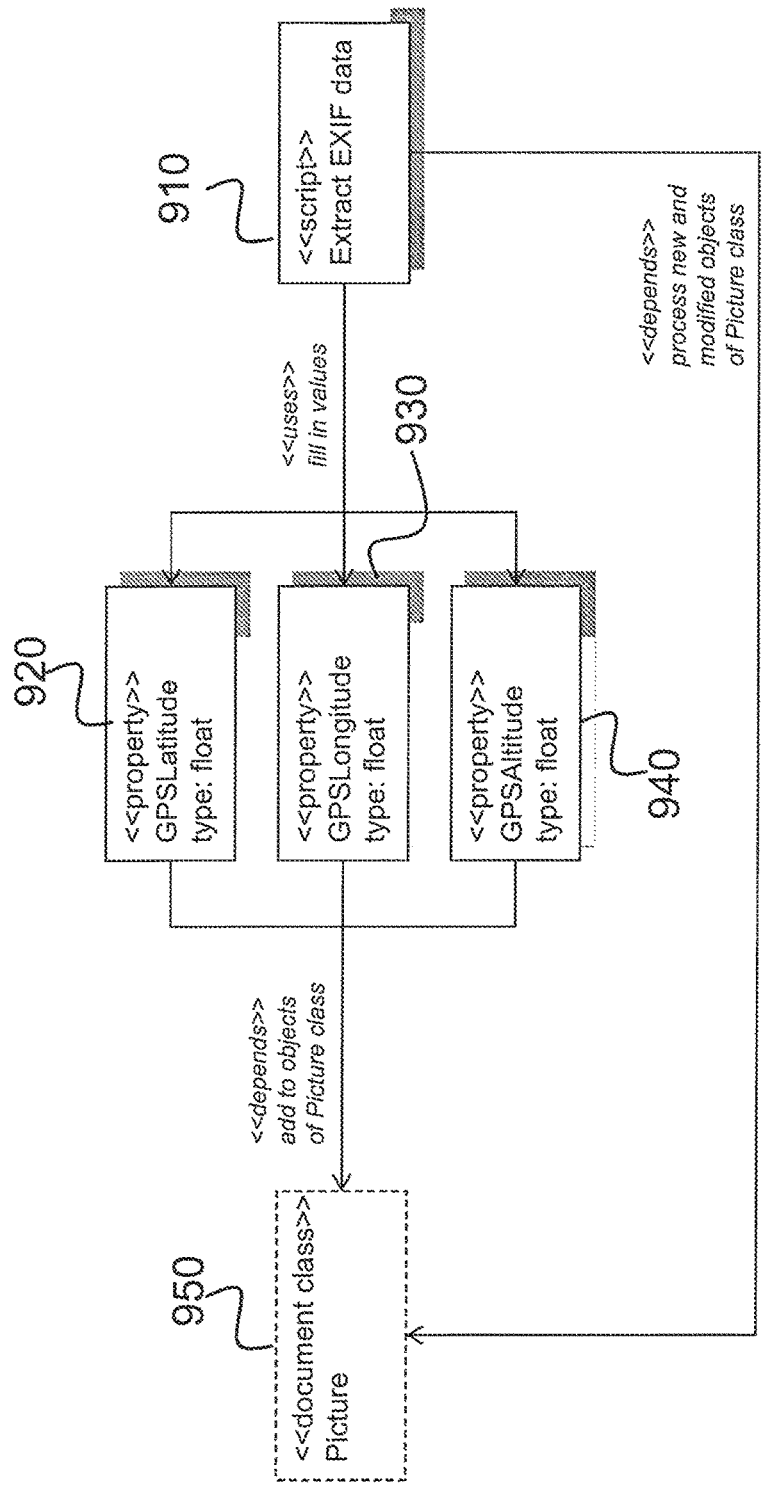
FIG. 9 shows an example of metadata structure fragments representing an application logic according to an embodiment.

FIG. 9 illustrates an example of metadata structure fragments that represent an application logic. In this simplified example, the application logic extracts embedded geolocation information from image files and stores it as their metadata. Image as an electronic object is associated with metadata properties, such as latitude 920, longitude 930 and altitude 940 defining the image capturing surroundings. An application script 910 is able to read image data in order to fulfill the metadata properties 920, 930, 940. The script 910 depends on a document class "Picture", whereby the script is able to process all new and modified objects belonging to this class, i.e. images. The metadata properties also depend on document class "Pictures", whereby the properties are added to objects belonging to this class.

Figure 10:
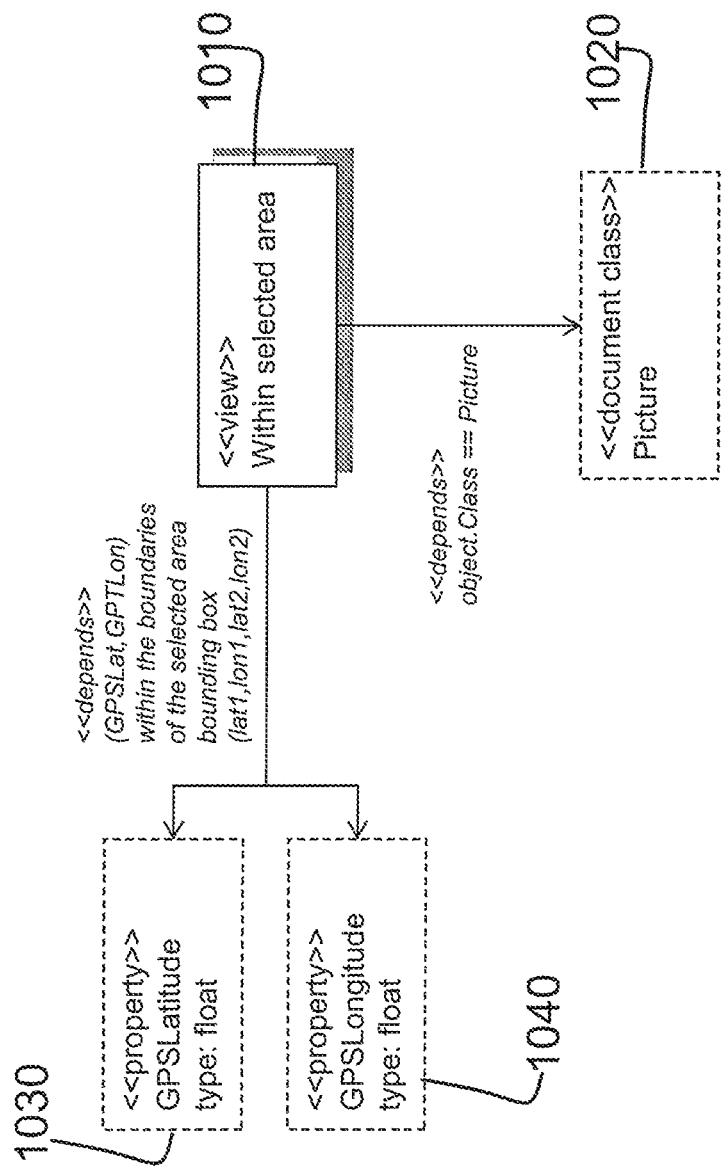
FIG. 10 illustrates an embodiment of a user interface view for an example of FIG. 9.

FIG. 10 illustrates an example of a user interface (UI) view for showing the images being defined according to FIG. 9. The UI view 1010 depends from the document class 1020, i.e. "Pictures", but also on the metadata properties latitude 1030 and longitude 1040. By this the view can be imported to any vault, where corresponding class and metadata properties are found by means of common names.

Figure 11:
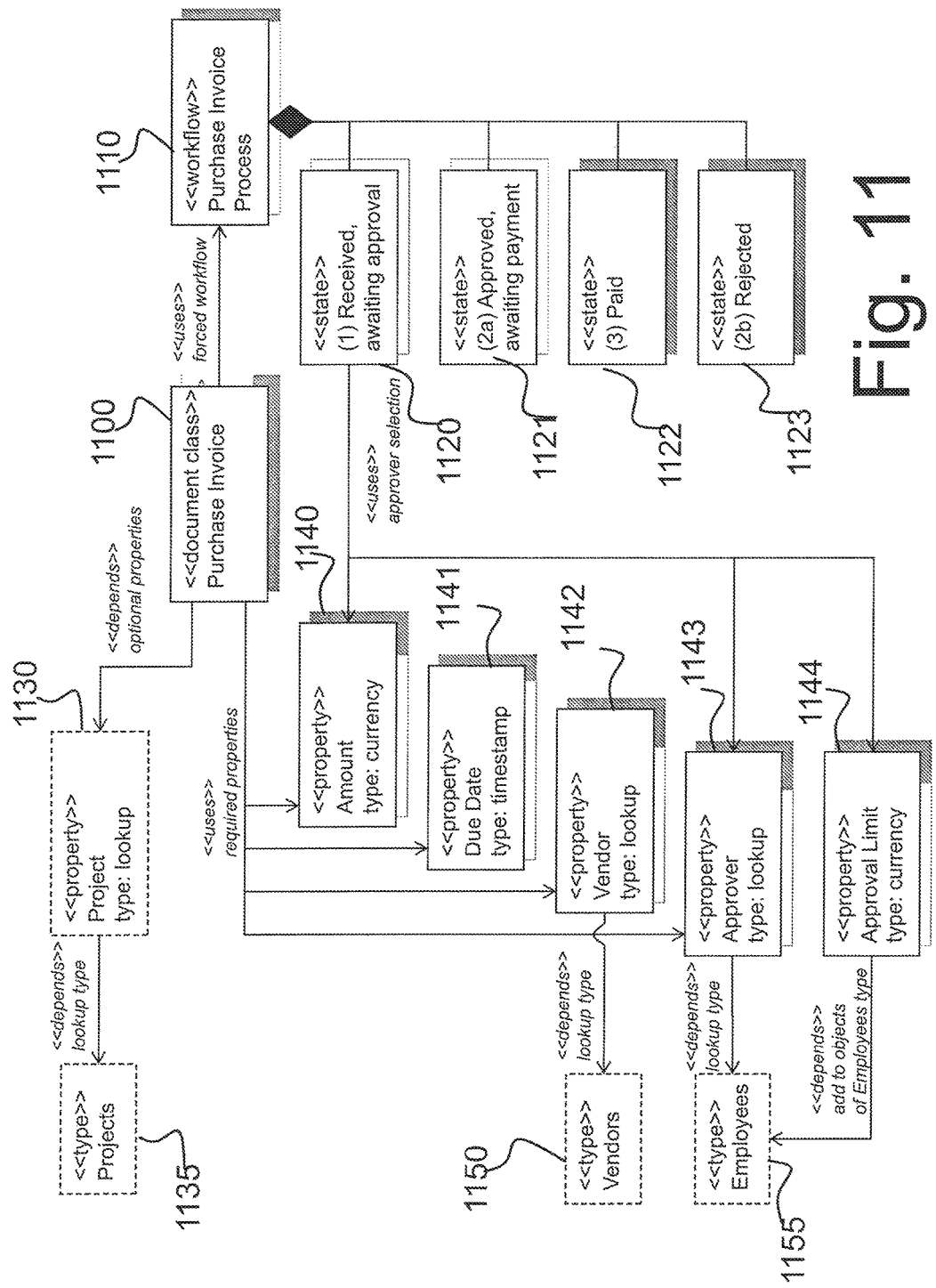
FIG. 11 shows an example of a simplified business logic with metadata structure fragments.

FIG. 11 illustrates an example of a business logic for invoice processing. In this example, the object is a purchase invoice 1100. The object 1100 is associated with properties "Amount" 1140, "Due date" 1141, "Vendor" 1142, "Approver" 1143 and "Approval limit" 1144. Property "Vendor" 1142 is dependent on type "Vendors" 1150 and properties "Approver" 1143 and "Approval limit" 1144 depend on type "Employees" 1155. In addition to the required properties 1140-1144, the object 1100 may have optional properties, such as "Project" 1130 that depends on type "Projects" 1135.

In addition, the object "Purchase invoice" 1100 uses forced workflow relating to "Purchase invoice process" 1110. The workflow "Purchase invoice process" 1110 has states "Received, awaiting approval" 1120, "Approved, awaiting payment" 1121, "Paid" 1122 and "Rejected" 1123.

Figure 12:
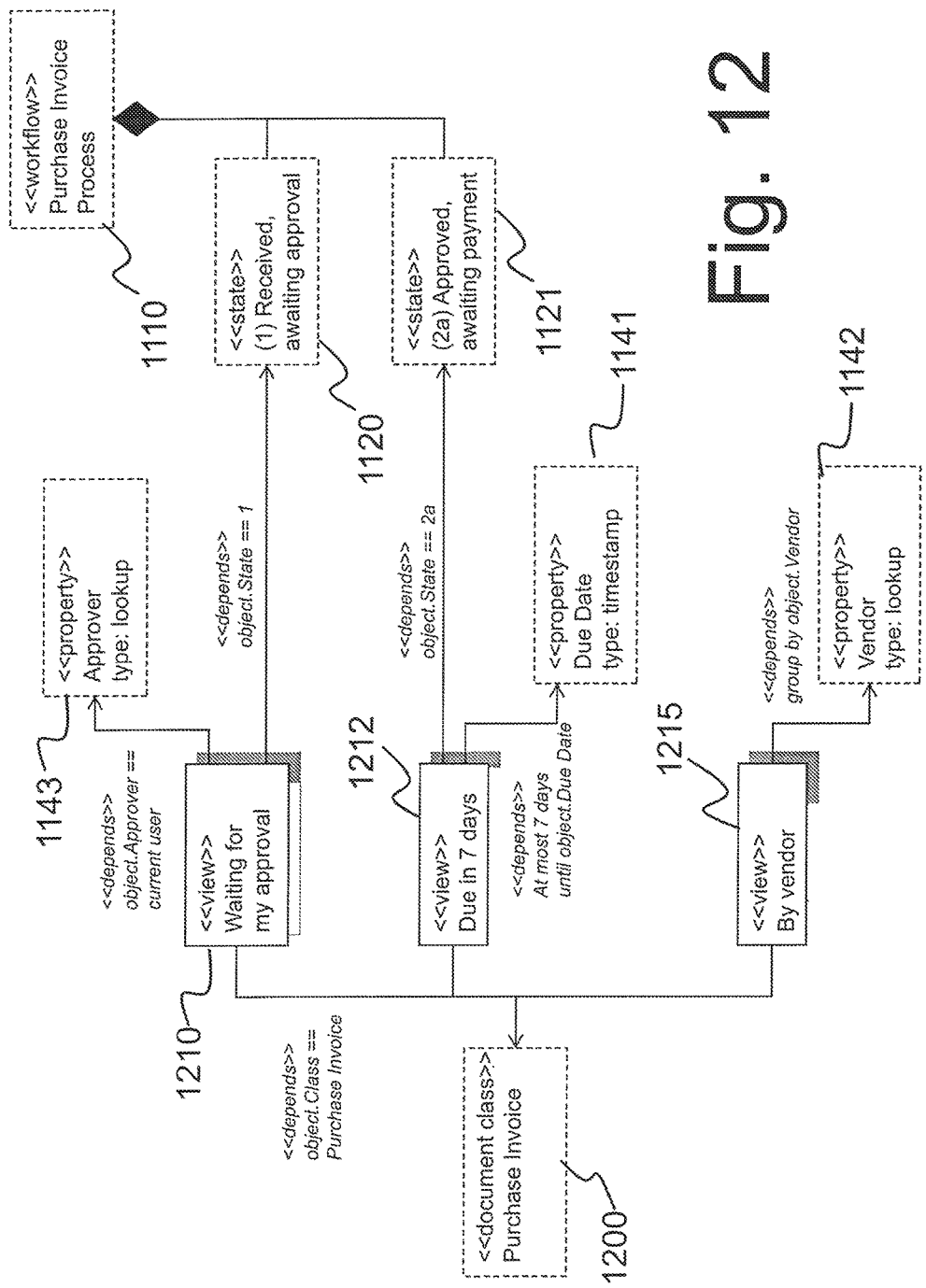
FIG. 12 illustrates an embodiment of user interface view for example of FIG. 10.

FIG. 12 illustrates an example of user interface (UI) views for objects belonging to class "Purchase invoice" 1200. The views, the purchase invoice documents depend on are "Waiting for my approval" 1210, "Due in 7 days" 1212 and "By vendor" 1215. The view "Waiting for my approval" 1210 depends on property "Approver" 1220 that is to be the current user. The same view 1210 also depends on a workflow state (1) "Received, awaiting approval" that originates from a workflow "Purchase invoice process" 1110 (see also FIG. 11). The view "Due in 7 days" 1212 depends on a property "Due date" 1141 (see also FIG. 11) and workflow state "Approved, awaiting payment" 1121 (see also FIG. 11), which is a state of "Purchase invoice process" 1110. The view "Vendor" 1215 depends on property "Vendor" 1142 (see also FIG. 11).

The examples of FIGS. 9-12 represent the metadata structure that needs to be taken care of before the content is copied between vaults.

After the metadata structure of the local main server 3 substantially corresponds to the metadata structure of the main server 1, the data content can be copied and further synchronized from the main server 1 to the local main server 3. The data that can be synchronized between the local main server and the main server comprises not only the document files, but also metadata, version history and references, or at least some of them, whereby it provides a better availability of data to the client than the caching replica server. The local main server 3 also may comprise various features for managing electronic documents, e.g. storing, versioning, indexing, searching for and retrieval of documents. The local main server 3 does not need to have a constant on-line connection to the main server 1. The connection can be formed when data is synchronized between the main server 1 and the local main server 3.

The client 10 may use the local main server 3 actively, and the caching replica server 2 only when needed. The client 10 may be configured to use both of the servers 2, 3, but the local main server 3 can be prioritized because it comprises the most important and complete data, which the client needs constantly. The caching replica server 2 may comprise data that is needed less frequently, e.g. archived data and other read-only data.

Typically, the main server 1 needs not to be used, because the local main server 3 comprises all the locally relevant data of the main server 1. In addition, the main server 1 may be located farthest away from the client 10, which on the one hand means that the physical distance between the client 10 and the main server 1 is long or they situate in different networks, but on the other hand relates to the accessibility from the client 10 to the main server 1. In order to access the data in the main server 1, the client 10 may need to solve the availability of the main server network and problems that might be caused by slow data transfer. The local main server 3 may be located closest to the client, either physically but also in terms of data accessibility. Therefore, the local main server 3 optimizes network usage and data availability, because all the locally relevant data is available and no attention needs to be paid to network accessibility and possible network problems.

When a document is created in one of the aforementioned servers, the document is assigned a previously mentioned global/universal unique identification (i.e. GUID). The identification comprises an identification of the home server (i.e. the server where the document was created) and an individual identification of the document in the home server. As a result of this, the object has a global/universal unique identification that differentiates the object throughout the system, but also a local identification that differentiates the object in a certain server.

At the time the local main server 3 is established the data from the main server 1 is copied (i.e. synchronized) to the local main server 3. After that, the data can be synchronized between the local main server 3 and the main server 1 always when needed. Because the connection between the main server 1 and the local main server 3 is not necessarily constantly on, the synchronization may be performed in certain periods. This means that updateable data is gathered for a certain time, and all the data that has been gathered until then are transmitted simultaneously.

When an document is copied to the other server (e.g. from the main server 1 to the local main server 3), it is determined whether the target server (i.e. local main server 3 in this example) already comprises the object. That can be determined by checking whether the target server comprises any object having the same global/universal unique identification. If the target server already comprises the object, any changes relating to the object are transmitted to the target server. If the object is not in the target server, a new object corresponding the transmitted object is created in the target server, with the original unique identification and local identification, which local identification relates to the target server.

As discussed, in addition to the document file, also other data relating to the document can be transmitted (i.e. copied/synchronized) between the main server 1 and the local main server 2. Such data may include also the metadata structure and/or version history and/or references. As said, "metadata" refers to information on a document's properties. For example, a creator of the file or a creation date may represent content of the metadata. Metadata is composed of two parts—a definition part and a content part. The definition part defines generally the type of property; client, project, customer, creator, date, etc. The content part on the other hand specifies the value of the metadata, i.e. which client ("Beef Eaters Ltd"), which project ("BBQ party"), which customer ("Edvin Tournedous"), which creator ("John Leaderman"), which date ("20120501"). For further example, specified values for a creator of the file or a creation date represent content of the metadata. In addition, a project which the document belongs to; a client who owns the document; a type of the document (letter, assignment, publication, order etc.); name of the document are examples of the content of metadata. Despite the plural form of metadata, in this disclosure, the term metadata may also refer to a singular form. Therefore, an object being defined by "metadata" may in practice be defined by one or more pieces of metadata. In the present disclosure, term "property-properties" is used as a synonym for metadata.

The metadata structure is a selection of properties for a specific server but also the metadata structure may represent semantics including application logic for the metadata—as discussed with FIG. 6. These properties are selected and named for server's purposes, for example, according to the business area, according to the information required for running the business, according to the workflow, according to the correspondents, according to the personnel etc. This selection of properties are used for each document in the server in question either completely or selectively.

FIG. 2 illustrates an example of a metadata structure 200 for a main server 1, and an example of a metadata structure 210 for a local main server 3. The metadata structure 200 comprises properties "Name", "Creator", "Created", "Category", "Type", "Sent", "Client", "Client number" and "Last modified" having values for a certain document "letter.doc", "John Welsh", "2012-05-01", "projects", "offer", "2012-05-08", "The Firm LTD", "1209324" and "Ella May", respectively. The metadata structure 210 comprises properties "Title", "Author", "Created", "Class", "Sent", "Client", "Client number" and "Last modified".

It is realized that in the example of FIG. 2, the metadata structures 200, 210 are different. It is possible, that either all the property types are different, or the names of the property types are different even though they relate to same property.

When the metadata structures in the main server 1 and the local main server 2 are the same, the documents may be transmitted directly between the servers. However, when the metadata structures deviate from each other (as in FIG. 2), a selection how the metadata is synchronized between the servers needs to be made, when a document is copied to another server.

One embodiment is to perform metadata synchronization between servers is to use common names (i.e. aliases). Alias is a common name or identification for a property defining a similar content. For example alias "creating person" can be an alias for properties "an originator", "a creator", "an author". In addition, the alias can be a common numerical value being assigned for similar types of properties. At the time the metadata structure having a property for "a creator" is transmitted to a target server, it is checked whether "a creator" has an alias. If so, the alias, e.g. "creating person" is looked for in the target server. Depending on the property name the target server uses, the metadata structure being transmitted is synchronized accordingly. The target server may have a property "author" that has an alias "creating person". Therefore, if the target server uses "author" as a property name, the metadata structure being transmitted is synchronized to have a property "author" instead of "creator".

Another embodiment for performing metadata synchronization between servers is by using globally unique identifications (GUIDs).

It is also appreciated that synchronization by common names and synchronization by GUIDs can occur in parallel according to a certain rules. For example, all such elements that are strongly part of the data structure, may be mapped in the target server (vault) by means of their GUID. However, elements that are depended from, are mapped by means of their common names.

If an alias (i.e. common name) is not found for a certain property, the system may be configured to use the property name as an alias, and to perform the mapping based on these property names. This means that any property (piece of metadata) of a document that has a corresponding property (having a same name) in the target server is transmitted to the target server.

If a property of a document does not have a corresponding property (matching property names or aliases) in the target server, such a property can be ignored and left out from transmission. This is possible, because it is assumed that the most important properties (e.g. a creator, a date, etc.) have correspondences in the target server being identified by GUIDs.

In the example shown in FIG. 2, the alias-based (i.e. common name) synchronization can be performed as shown in FIG. 3. FIG. 3 shows the metadata structure 200 with properties and their corresponding aliases 201 listed. Property "Name" has alias "Filename", property "Creator" has an alias "Generator", property "Created" has an alias "Generated", property "Category" has an alias "Group", property "Type" has an alias "Type", property "Sent" has an alias "Mailed", property "Client" has an alias "Client", property "Client number" has an alias "Client number", property "Last modified" has an alias "Last updated". It is appreciated that in this example, the alias names have been selected to be descriptive names for understanding purposes. However, any string of letters and/or numbers can be used as an alias as long as it has a common meaning for different servers' metadata structure. Such terms can be found e.g. from general concepts such as Dublin Core, where "dc:publisher" could be used as an alias for property "publisher" of main server 1 and for property "producer" of local main server 3.

In a similar manner, the metadata structure 210 has aliases 211 listed. Property "Title" has alias "Filename", property "Author" has an alias "Generator", property "Created" has an alias "Generated", property "Class" has an alias "Group", property "Sent" has an alias "Mailed", property "Client" has an alias "Client", property "Client number" has an alias "Client number", property "Last modified" has an alias "Last updated".

It is realized that alias-based mapping can be performed for properties "name", "creator", "created", "category", "sent", "client", "client number" and "last modified" of the metadata structure 200 to metadata structure 210, because those properties have common names having match in the target metadata structure.

In another embodiment, properties such as "Created", "Sent", "Client", "Client number" and "Last modified" could also be directly mapped to the metadata structure 210 of the other server based on property names only, because both metadata structure comprises same property names.

In the example of FIG. 3, common names between two metadata structures have been presented. However, it is possible that a property may have several aliases to allow mapping between several different types of metadata structures. This means that a property "name" in a metadata structure may have an alias "creator" for a first metadata structure and also an alias "owner" for a second metadata structure. However, this may cause conflict if, at the time the metadata is mapped to the first metadata structure, the first metadata structure comprises properties "creating person" having alias "creator" and "owning person" having an alias "owner". Therefor a property "name" having aliases "creator" and "owner" could be mapped to any of them. In order to solve this, the mapping may be carried out according to a priority list or the mapping of such property can be rejected.

By using the common names, i.e. aliases, the mapping of properties is enabled. It is realized from FIG. 3 that property "Type" of metadata structure 200 is not included in the metadata structure 210 in any form. Therefore, property "Type" is left out, when the document comprising the metadata structure 200 is copied to a server supporting the metadata structure 210.

According to FIG. 3, the alias listing can be presented together with the metadata structure. However, this may not be the case in practice. The alias listing may be stored as a table in at least one of the servers. Optionally, the aliases may be appointed to each property individually, as a part of the property definition.

The metadata structure can be transferred between servers by means of a metadata structure template provided e.g. by the target server. The template can be utilized to adapt the metadata structure of the source server according to format of the metadata structure of the target server. The template can include all the properties that are supported by the target server, whereby the mapping of properties can be done before the metadata structure is actually transmitted to the target server. The template can be formed of alias names which correspond the properties in the target server. For example, taking FIG. 3 as an example, the template may include alias listing as referred by 211. The metadata structure being transmitted with the document is mapped to that listing 211, and the new metadata structure for the document comprises all the matching properties of the template.

The present embodiment for using aliases together with the metadata structure also makes it possible to perform a metadata driven search from multiple servers at the same time, and to show the results in one window. For example, user may perform a query that is directed to servers that are included in the system and having a certain metadata structure for documents being stored. The metadata driven search means that when a user wishes to search for "client=Company X", the system is configured to perform the search by means of aliases of "client" in addition or instead to the direct query for "client". The search procedure can be carried out such a manner that it is solved whether the searched property has an alias, and if so, the search query is expanded to include also the alias. If the alias of "client" is "CU52M3R", then the search query can formulated "client=Company X or alias=CU52M3R=Company X".

It is also possible that the search query includes only the alias, and the search is performed only according to alias name. When the search is carried out with the alias, any property in the search target servers having a same alias are reached. And if such a property, despite the property name, has a value "Company X", the document comprising such property is returned as a search result. Therefore, alias based metadata driven search makes it possible to perform searches by means of metadata values between servers having a different metadata structure.

It has been described that each property in the metadata structure is copied to the target server, if such a property can be mapped to the metadata structure of the target server. However, the source server may define that even though the metadata structure comprises mappable properties, a certain property is still not published in the metadata structure of the target server or transferred at all to the target server. Each property in the metadata structure may have a mark (a flag, a numerical value, a letter) that indicates whether the property in question can be published or not. For example, for certain local servers held by subcontractors, property "customer" can be hidden or unpublished. The controlled publication may relate to the document also. This means, that a property of the document may indicate whether the document can be published in the target server or not.

In addition, each property in the metadata structure may have mark (a flag, a numerical value, a letter, a definition) that indicates the permission to transfer such property to the target server or any server to which such property can be transferred. For example, some properties for HR server (human resources) may be considered secret for employee server, and such properties are not transferred with the documents.

In the previous description, the term "property" should be read to include any feature of the document. A mappable property is either a name of a user-defined feature (i.e. a name-value pair) of an electronic object, or a property value of certain properties with predefined semantics (such as a class, a workflow, a workflow state, a permission etc.).

The mapping process can be performed by such server that is a target of synchronization. The sending server (that has the document and the associated properties to be synchronized) provides the document and the associated properties with the alias data to the target server. By the received information, the target server is able to perform the mapping. This means that the sending server filters the metadata structure to include only the common names it is willing to expose, and the receiving server converts the common names to correspond the receiving server's metadata structure.

An example of a server is illustrated in FIG. 4. The server 400 comprises a processor 490 (Central Processing Unit, CPU) for processing data and a memory 470 that may store applications and various data etc. The server also comprises computer program code 475 residing in the memory 470. The memory 470 may be, but is not limited to, a single memory, CD, DVD, ROM, RAM, EEPROM, optical storage, or any other non-volatile storage medium capable of storing digital data.

The server 400 comprises also a control unit 430 for controlling functions in the server 400. The control unit 430 (MCU, Main Control Unit) may comprise one or more processors. The control unit 430 may run a user interface software to facilitate user control of at least some functions of the server 400. The control unit 430 may also deliver a display command and a switch command to a display 440 to display visual information, e.g. a user interface. The server may also be connected to a keypad 450 for receiving input from the user. The control unit 430 may also communicate with the processor 490 and can access the memory 470.

Yet further, the server may comprise various communication means 420, 480 having a transmitter and a receiver for connecting to the network and for sending and receiving information. The first communicating means 420 can be adapted for telecommunication and the other communicating means 480 can be a one kind of short-range communicating means, such as Bluetooth™ system, WLAN system (Wireless Local Area Network) or other system which suits for local use and for communicating with another device.

Figure 5:
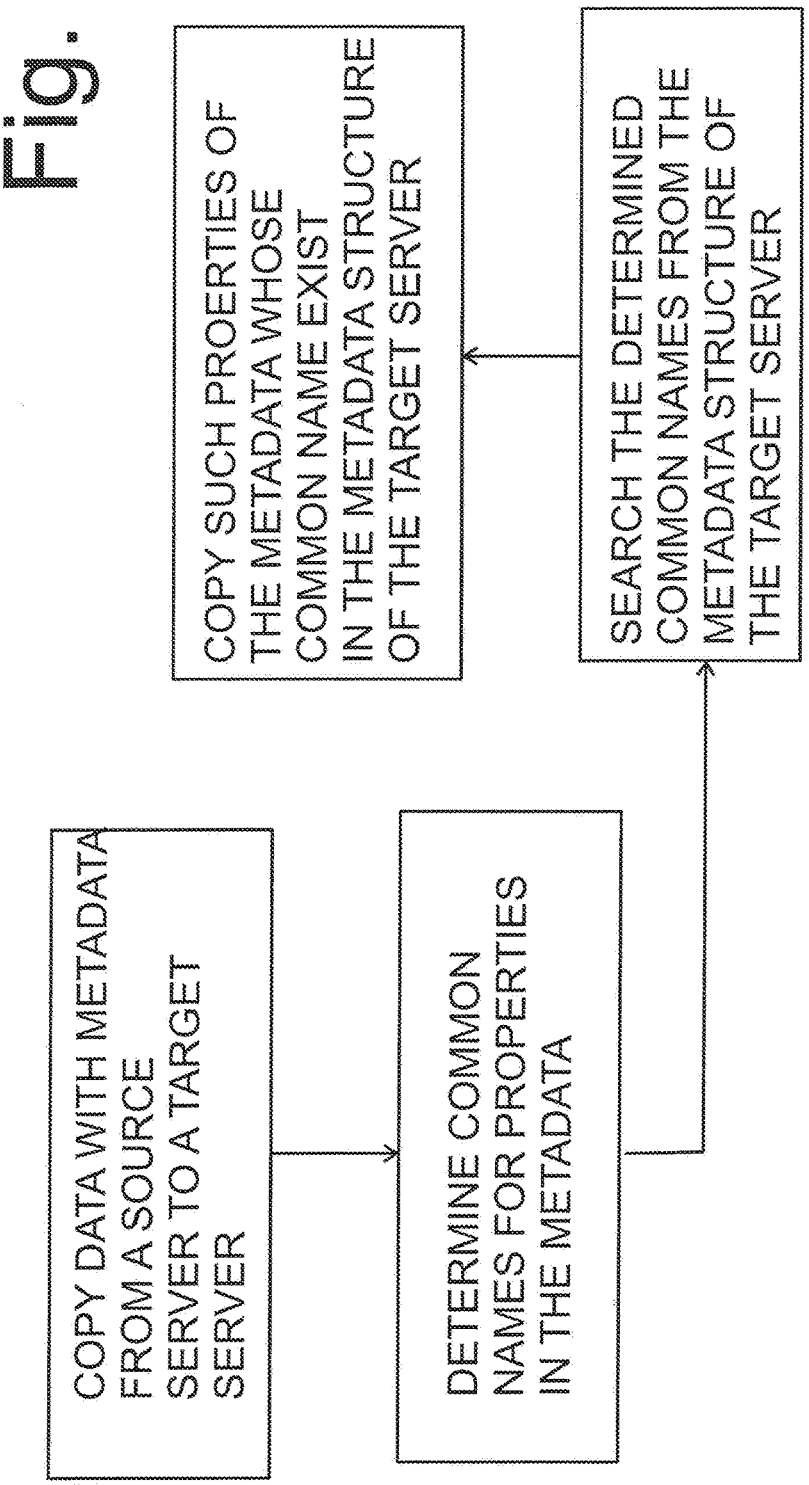
FIG. 5 shows an embodiment of the method as a simplified flowchart.

FIG. 5 illustrates an embodiment of the method as a simplified flowchart.

Figure 13:
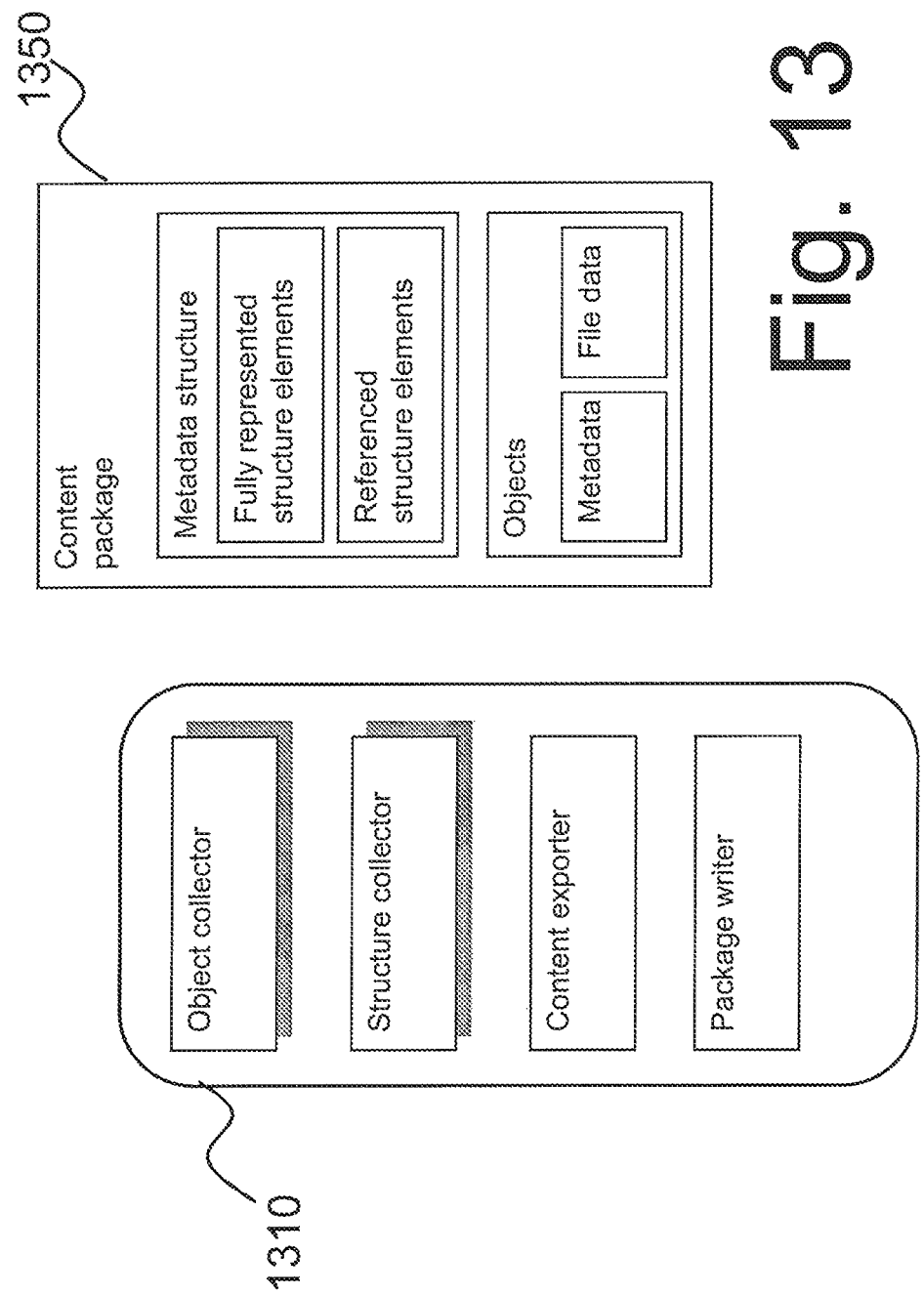
FIG. 13 illustrates an example of elements of a document vault for exporting data.

FIG. 13 illustrates an example of elements of a document vault 1310 that exports data to a target vault. The document vault 1310 may comprise an object collector, a structure collector, a content exporter and a package writer. The object collector is configured to gather the selected object as replicated metadata and file data, but also reference structure elements via dependencies. The structure collector is configured to gather the selected structure elements as fully represented elements, and also referenced structure elements via dependencies. The package writer is configured to create a content package with the content exporter. An example of the content package is show with reference 1350. In this embodiment, the package 1350 contains the data that is to be exported, i.e. metadata structure containing fully represented structure elements (mapped with GUID) and referenced structure elements (mapped with common names). The content package 1350 also contains objects and their metadata and file data. After the packet is completed, the packet can be exported to the target vault.

It is appreciated that the package 1350 may contain only the metadata structure or both the metadata structure and objects. If the package 1350 is used to import only content (i.e. objects), the package 1350 should include also such structure elements, e.g. property definitions, which are referred by the object metadata. However, in a typical use case, a package 1350 containing only the metadata structure is imported at first, after which a continuous sequence of package 1350 containing the objects with reference to the structure elements is imported separately.

Figure 14:
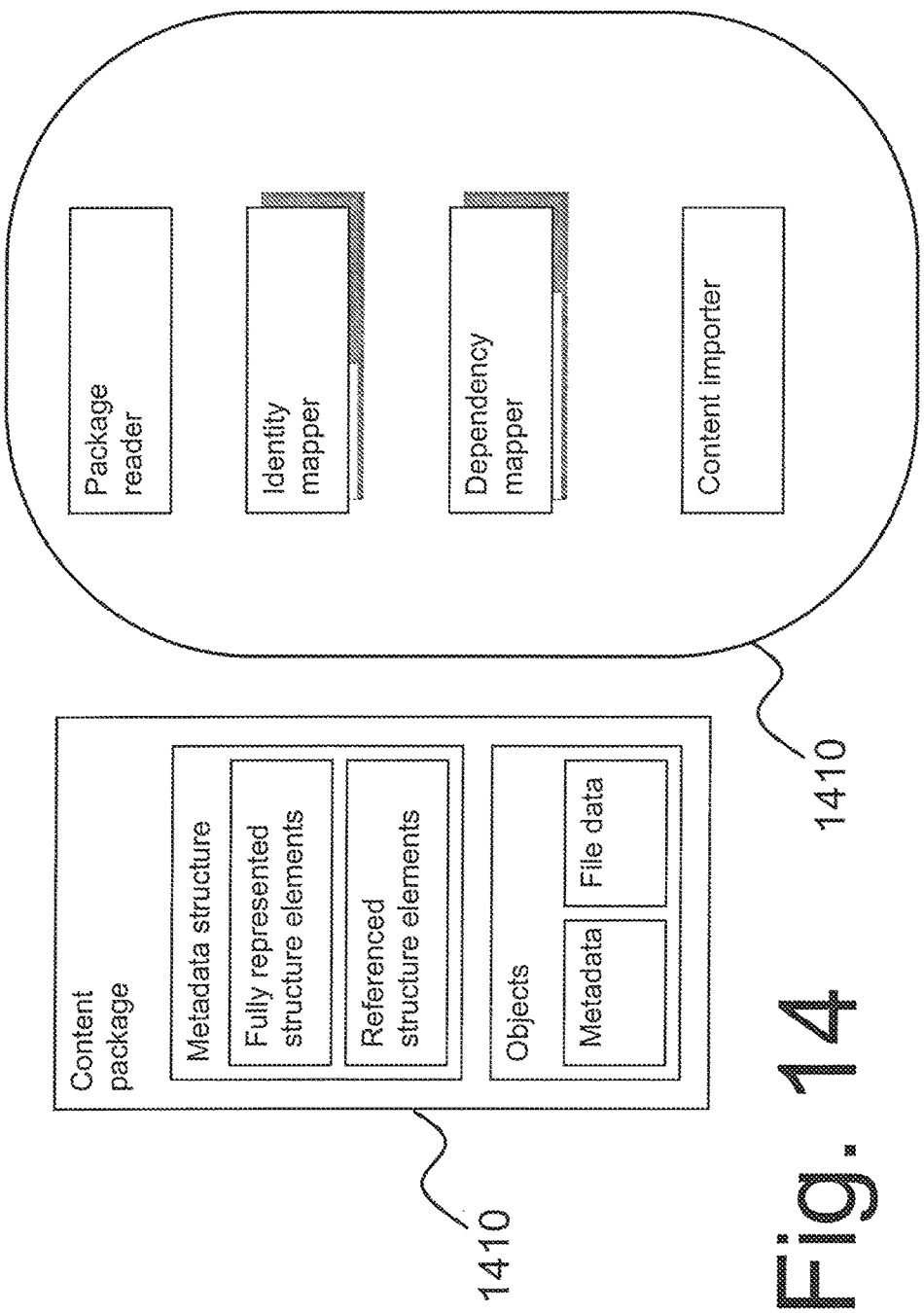
FIG. 14 illustrates an example of elements of a target document vault.

FIG. 14 illustrates an example of elements of a target document vault 1410 that receives the imported data. The target document vault 1410 comprises a package reader, identity mapper, dependency mapper and content importer. The package reader is configured to read and parse the package content. The identity mapper is configured to perform identity (i.e. GUID) mapping (strong identity mapping) for fully represented elements and objects. This means that such a corresponding element needs to be found, that has exactly the same identity. The identity mapper performs similarity (i.e. common names) mapping (weak identity mapping) for referenced elements. The dependency mapper resolves dependencies for each element. Element with unmappable dependencies are skipped. Such object metadata that has unmappable structure dependencies are dropped. The content importer is configured to add or update object. For example, such fully represented elements that are missing are added. Such fully represented elements that already exist, are updated.

The various embodiments of the invention can be implemented with the help of computer program code that resides in a memory and causes the relevant apparatuses to carry out the invention. For example, a client device may comprise circuitry and electronics for handling, receiving and transmitting data, computer program code in a memory, and a processor that, when running the computer program code, causes the client device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The present embodiments represent a great achievement in the field. In an embodiment, the content management system is a hybrid system comprising a main server residing in the cloud service and a local main server (optionally with a caching replica server) being an on-premise server. Such a hybrid system comprises substantially equally strong servers (main server and local main server), which together can provide their own benefits to the user. For example, because of the local main server the data usage becomes fast, and because of the cloud server, the data is always (temporally and geographically) available, The use of caching replica server, on the other hand, reduces the copying need for all the data, because in addition to providing a direct connection to the main server, it caches the frequently used data closer to the user.

A synchronized local main server having the relevant data copied close to the user, on the other hand, improves the availability of the system and data, for example, if the network connections are not optimal for continuous online connectivity, thus contributing to an offline mode between servers.

It is obvious that the present invention is not limited solely to the above-presented embodiments, but it can be modified within the scope of the appended claims.

What is claimed is:

1. A method for replicating metadata structure from a source server to a target server, comprising:
   importing the metadata structure of the source server to the target server, the metadata structure defining application logic for structure elements of a metadata associated with electronic objects being stored in said source server, wherein the metadata structure comprises fully represented structure elements of the metadata having dependencies on referenced structure elements of the metadata, wherein the fully represented structure elements represent the application, and wherein the referenced structure elements do not belong to the application, wherein the importing comprises:
   mapping fully represented structure elements belonging to a metadata structure to corresponding structure elements in the target server according to an identity mapping;
   mapping a group of referenced structure elements to corresponding structure elements in the target server according to a similarity mapping, said group containing one or more referenced structure elements being referred to by fully represented structure elements, wherein such one or more referenced structure elements are skipped that are not referred to by any fully represented structure element, wherein the similarity mapping comprises determining aliases for structure elements, an alias defining a general concept for a structure element in question; and determining if the metadata structure of the target server comprises structure elements having the same aliases; and in determining the metadata structure of the target server comprises structure elements having the same aliases, copying such structure elements from the source server that have matching aliases in the metadata structure of the target server;
   importing fully represented structure elements to be part of the metadata structure of the target server, wherein the importing comprises updating the corresponding structure element with a fully represented structure element if the corresponding structure element exists in the target server, or adding a fully represented structure element, if a corresponding structure element does not exist in the target server;
   importing content elements, in determining the content elements are available, containing at least electronic objects with associated metadata from the source server to the target server, which content elements refer to available fully represented structure elements or referenced structure elements.

2. The method according to claim 1, wherein semantics define at least application logic for using structure elements.

3. The method according to claim 1, wherein similarity mapping is based on common names of structure elements.

4. The method according to claim 1, wherein identity mapping is based on globally unique identifications of structure elements.

5. The method according to claim 1, wherein one or more referenced structure elements are also referred by at least one content element.

6. The method according to claim 1, wherein the content elements and the structure elements are packaged and transmitted in a packet.

7. The method according to claim 1, wherein copying the content elements comprises determining common names for properties of the content elements' metadata, determining which of the determined common names exist in the metadata of the target server; and copying—together with the content elements—such properties of the content elements' metadata that have matching common names in the target server.

8. The method according to claim 1, wherein one of the servers is a cloud-based server.

9. The method according to claim 1, wherein the metadata is a feature of an electronic object that is expressed as a name-value pair.

10. The method according to claim 1, wherein one of the servers is an on-premise server, wherein the other of the servers is a cloud server.

11. A source server comprising a processor, a memory including computer program code, the memory and the computer program code configured to, with the processor, cause the source server to perform at least the following:
    to transmit metadata structure of the source server to the target server, the metadata structure defining application logic for structure elements of a metadata associated with electronic objects being stored in said source server, wherein the metadata structure comprises fully represented structure elements of the metadata having dependencies on referenced structure elements of the metadata, wherein the fully represented structure elements represent the application, and wherein the referenced structure elements do not belong to the application;
    to transmit fully represented structure elements belonging to a metadata structure to a target server, where the fully represented structure elements are mappable to corresponding structure elements in the target server according to an identity mapping;
    to transmit a group of referenced structure elements, said group containing one or more referenced structure elements being referred to by fully represented structure elements; wherein such one or more referenced structure elements that are referred to by at least one fully represented structure element are mappable to corresponding structure elements in the target server according to a similarity mapping, wherein the similarity mapping comprises determining aliases for structure elements, an alias defining a general concept for a structure element in question; and determining if the metadata structure of the target server comprises structure elements having the same aliases; and in determining the metadata structure of the target server comprises structure elements having the same aliases, coping such structure elements from the source server that have matching aliases in the metadata structure of the target server;
    to transmit content elements, in determining the content elements are available, containing at least electronic objects with associated metadata to the target server, which content elements refer to available fully represented structure elements or referenced structure elements.

12. A target server comprising a processor, a memory including computer program code, the memory and the computer program code configured to, with the processor, cause the target server to perform at least the following:
    to import metadata structure of the source server to the target server, the metadata structure defining application logic for structure elements of a metadata associated with electronic objects being stored in said source server, wherein the metadata structure comprises fully represented structure elements of the metadata having dependencies on referenced structure elements of the metadata, wherein the fully represented structure elements represent the application, and wherein the referenced structure elements do not belong to the application;
    to map fully represented structure elements belonging to a metadata structure to corresponding structure elements in the target server according to an identity mappings wherein the similarity mapping comprises determining aliases for structure elements, an alias defining a general concept for a structure element in question; and determining if the metadata structure of the target server comprises structure elements having the same aliases; and in determining the metadata structure of the target server comprises structure elements having the same aliases, copying such structure elements from the source server that have matching aliases in the metadata structure of the target server;
    to map a group of referenced structure elements to corresponding structure elements in the target server according to a similarity mapping, said group containing one or more referenced structure elements being referred to by fully represented structure elements, wherein such one or more referenced structure elements are skipped that are not referred to by any fully represented structure element;
    to import fully represented structure elements to be part of the metadata structure of the target server, wherein the importing comprises updating the corresponding structure element with a fully represented structure element fi the corresponding structure element exists in the target server or adding a fully represented structure element, if a corresponding structure element does not exist in the target server;
    to import content elements, in determining the content elements are available, containing at least electronic objects with associated metadata from the source server, which content elements refer to available fully represented structure elements or referenced structure elements.

13. A server system comprising a processor, memory including computer program code, the memory and the computer program code configured to, with the processor, cause the server system to harmonize metadata structure of a target server according to metadata structure of a source server by
    importing the metadata structure of the source server to the target server, the metadata structure defining application logic for structure elements of a metadata associated with electronic objects being stored in said source server, wherein the metadata structure comprises fully represented structure elements of the metadata having dependencies on referenced structure elements of the metadata, wherein the fully represented structure elements represent the application, and wherein the referenced structure elements do not belong to the application;

mapping fully represented structure elements belonging to a metadata structure to corresponding structure elements in the target server according to an identity mapping;

mapping a group of referenced structure elements to corresponding structure elements in the target server according to a similarity mapping, said group containing one or more referenced structure elements being referred to by fully represented structure elements, wherein such one or more referenced structure elements are skipped that are not referred to by any fully represented structure element, wherein the similarity mapping comprises determining aliases for structure elements, an alias defining a general concept for a structure element in question; and determining if the metadata structure of the target server comprises structure elements having the same aliases; and in determining the metadata structure of the target server comprises structure elements having the same aliases, copying such structure elements from the source server that have matching aliases in the metadata structure of the target server;

importing fully represented structure elements to be part of the metadata structure of the target server, wherein the importing comprises updating the corresponding structure element with a fully represented structure element if the corresponding structure element exists in the target server, or adding a fully represented structure element, if a corresponding structure element does not exist in the target server;

importing content elements, in determining the content elements are available, containing at least electronic objects with associated metadata from the source server to the target server, which content elements refer to available fully represented structure elements or referenced structure elements.

14. A computer program product comprising a non-transitory computer-readable medium bearing computer program code embodied therein for use with a computer, the computer program code comprising:

code for importing the metadata structure of the source server to the target server, the metadata structure defining application logic for structure elements of a metadata associated with electronic objects being stored in said source server, wherein the metadata structure comprises fully represented structure elements of the metadata having dependencies on referenced structure elements of the metadata, wherein the fully represented structure elements represent the application, and wherein the referenced structure elements do not belong to the application;

code for mapping fully represented structure elements belonging to a metadata structure to corresponding structure elements in the target server according to an identity mapping;

code for mapping a group or referenced structured elements to corresponding structure elements in the target server according to a similarity mapping, said group containing one or more referenced structure elements being referred to by fully represented structure elements, wherein such one or more referenced structure elements are skipped that are not referred to by any fully represented structure element, wherein the similarity mapping comprises determining aliases for structure elements, an alias defining a general concept for a structure element in question; and determining if the metadata structure of the target server comprises structure elements having the same aliases; and in determining the metadata structure of the target server comprises structure elements having the same aliases, copying such structure elements from the source server that have matching aliases in the metadata structure of the target server;

code for importing fully represented structure elements to be a part of the metadata structure of the target server, wherein the importing comprises updating the corresponding structure element with a fully represented structure element if the corresponding structure element exists in the target server, or adding a fully represented structure element, if a corresponding structure element does not exist in the target server;

code for importing content elements, containing at least electronic objects with associated metadata from the source server to the target server, which content elements refer to available fully represented structure elements or referenced structure elements.

15. The computer program product according to claim 14, wherein semantics define at least application logic for using structure elements.

16. The computer program product according to claim 14, wherein similarity mapping is based on common names of structure elements.

17. The computer program product according to claim 14, wherein identity mapping is based on globally unique identifications of structure elements.

18. The computer program product according to claim 14, wherein one or more referenced structure elements are also referred by at least one content element.

19. The computer program product according to claim 14, wherein the content elements and the structure elements are packetized and transmitted in a packet.

* * * * *

UNITED STATES PATENT AND TRADEMARK OFFICE
CERTIFICATE OF CORRECTION

PATENT NO. : 10,037,370 B2  
APPLICATION NO. : 13/900123  
DATED : July 31, 2018  
INVENTOR(S) : Markku Laitkorpi et al.

Page 1 of 1

It is certified that error appears in the above-identified patent and that said Letters Patent is hereby corrected as shown below:

In the Claims

1. In Claim 12, at Column 16, Line 41, please delete the word "fi" and replace it with the word --if--.

Signed and Sealed this
Ninth Day of October, 2018

Andrei Iancu
*Director of the United States Patent and Trademark Office*